May 2, 1939. N. P. HARSHBERGER 2,156,286
METHOD AND APPARATUS FOR MAKING BUILDING MATERIALS OR THE LIKE
Filed June 15, 1935 5 Sheets-Sheet 4
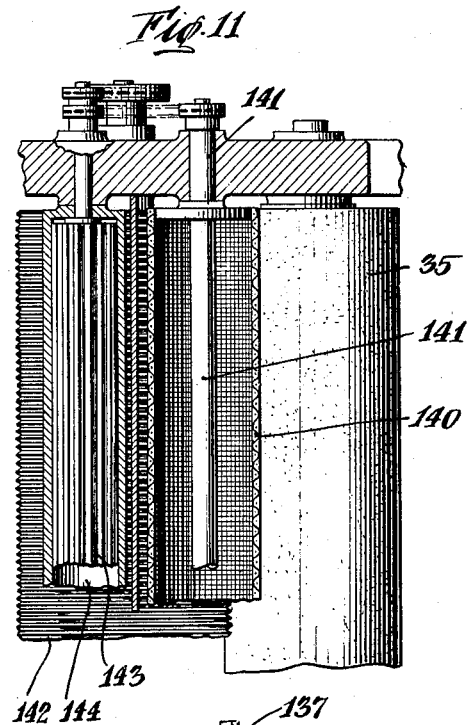
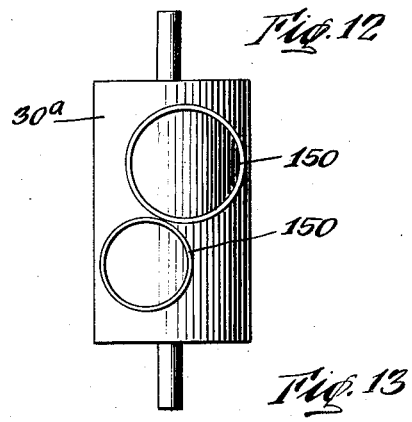
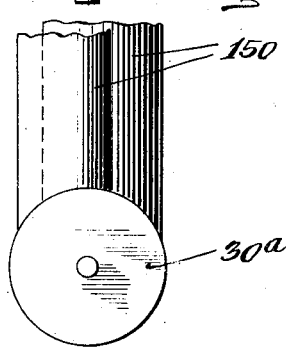
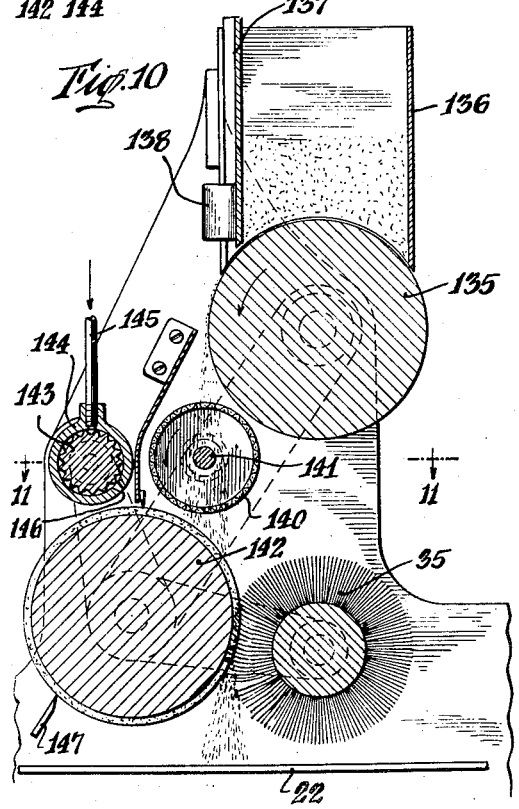
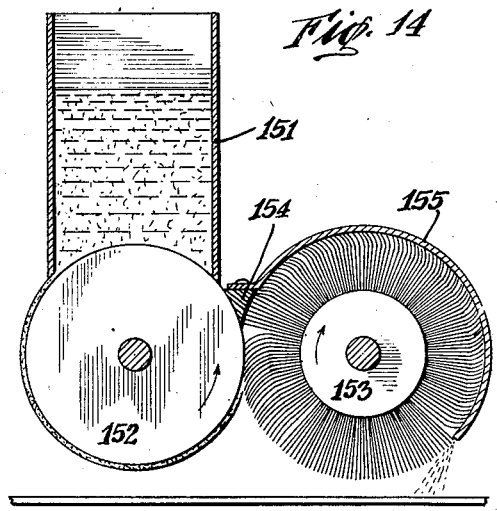
INVENTOR
Norman P. Harshberger
BY
Fred. W. Dodson
ATTORNEY

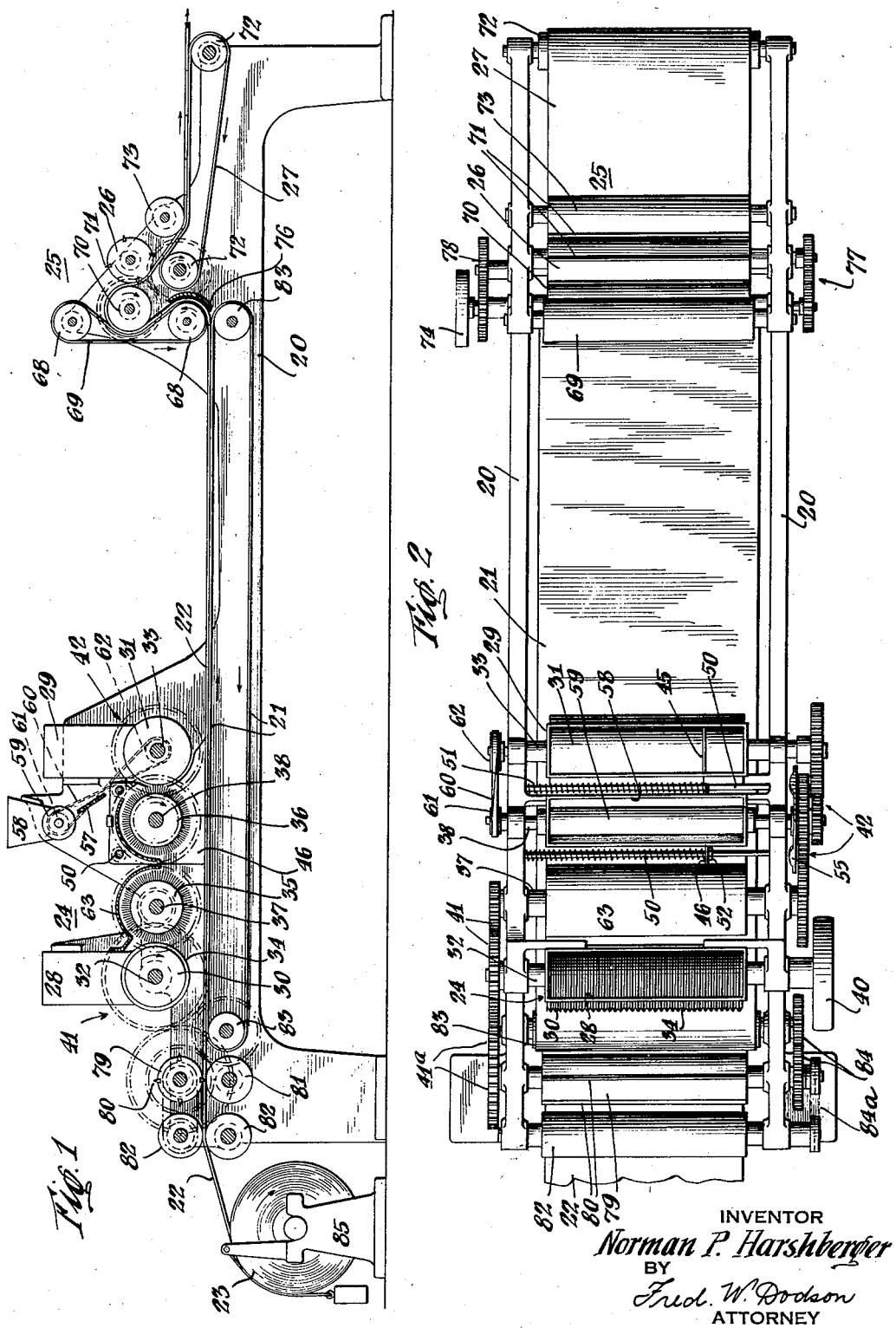

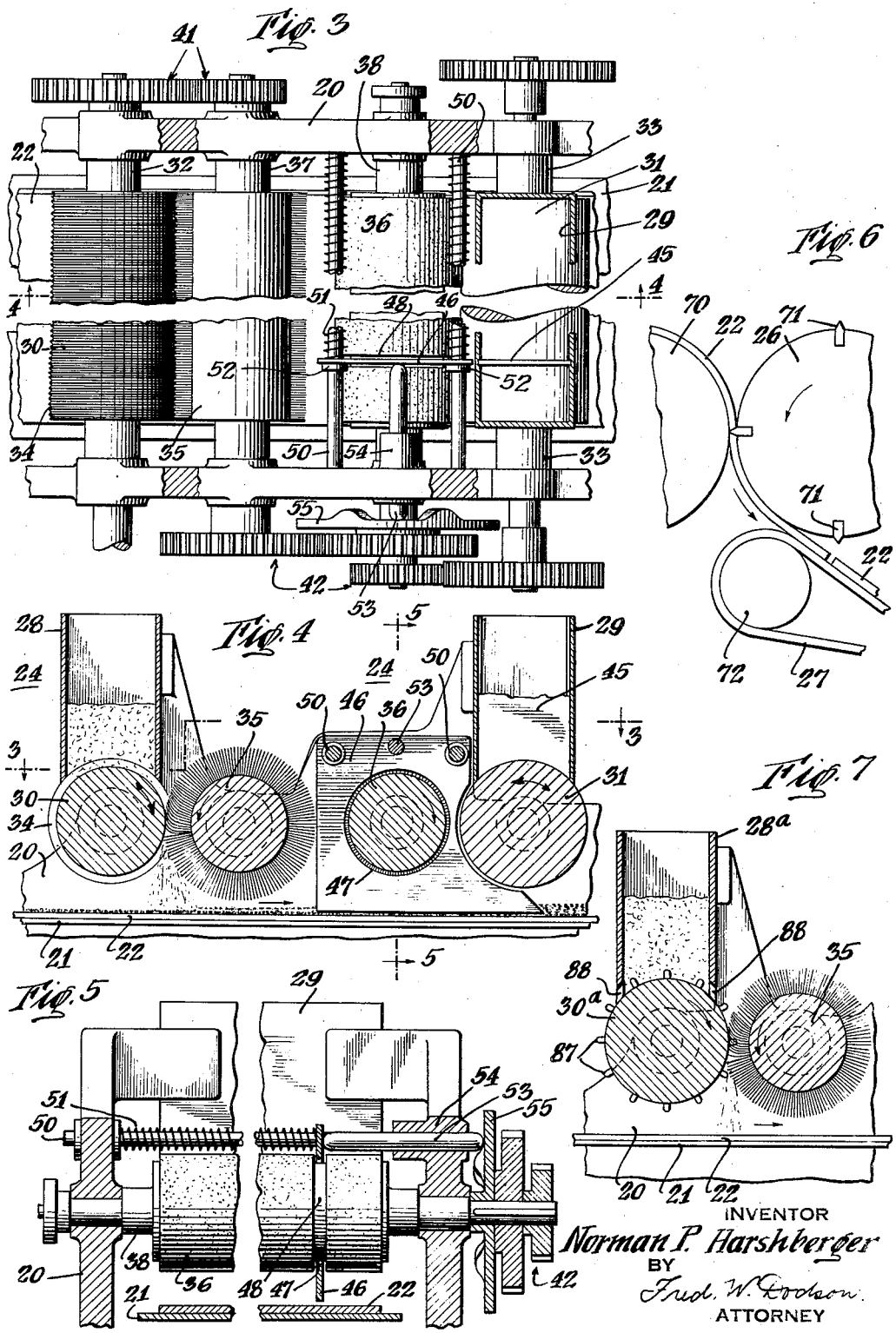

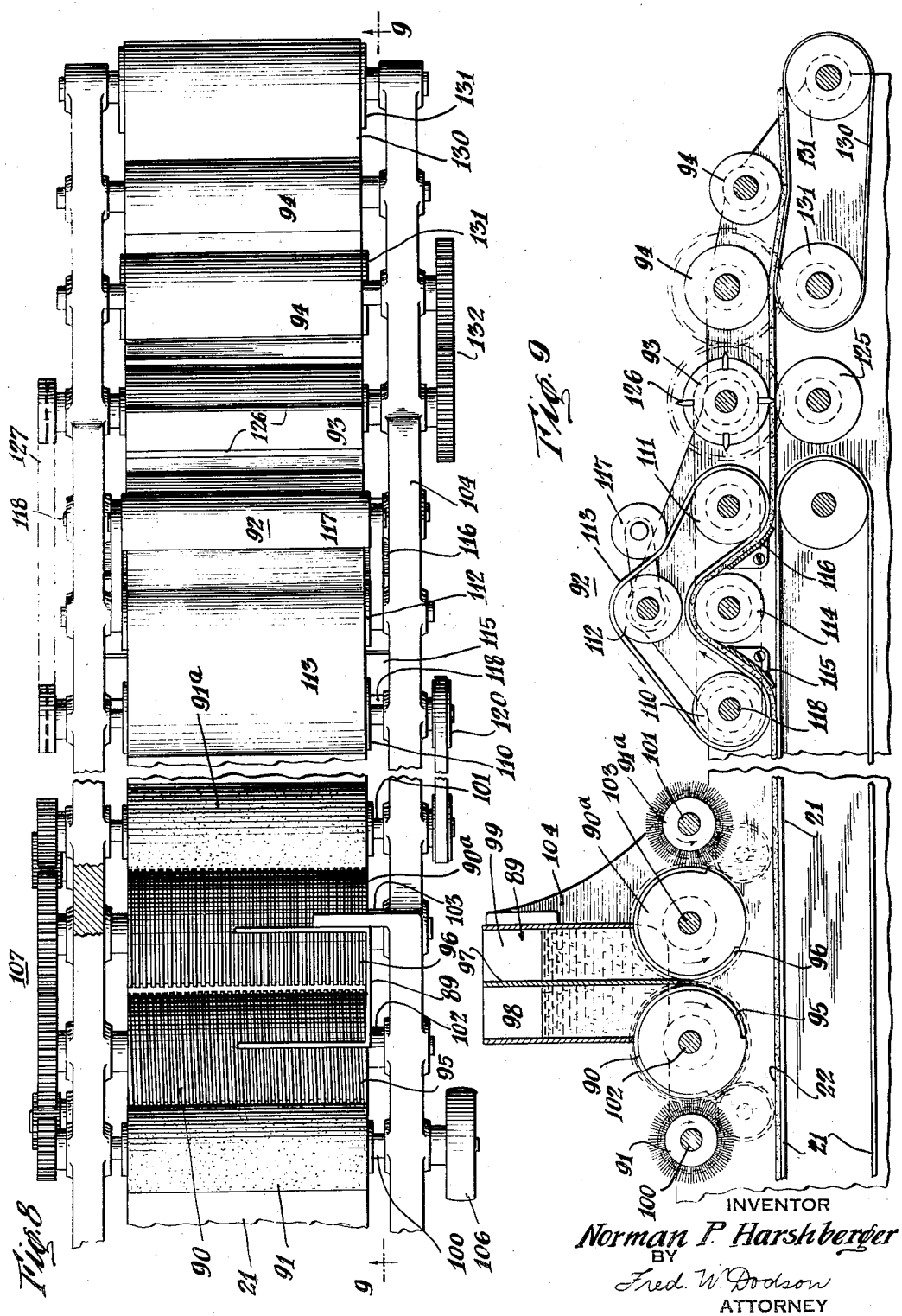

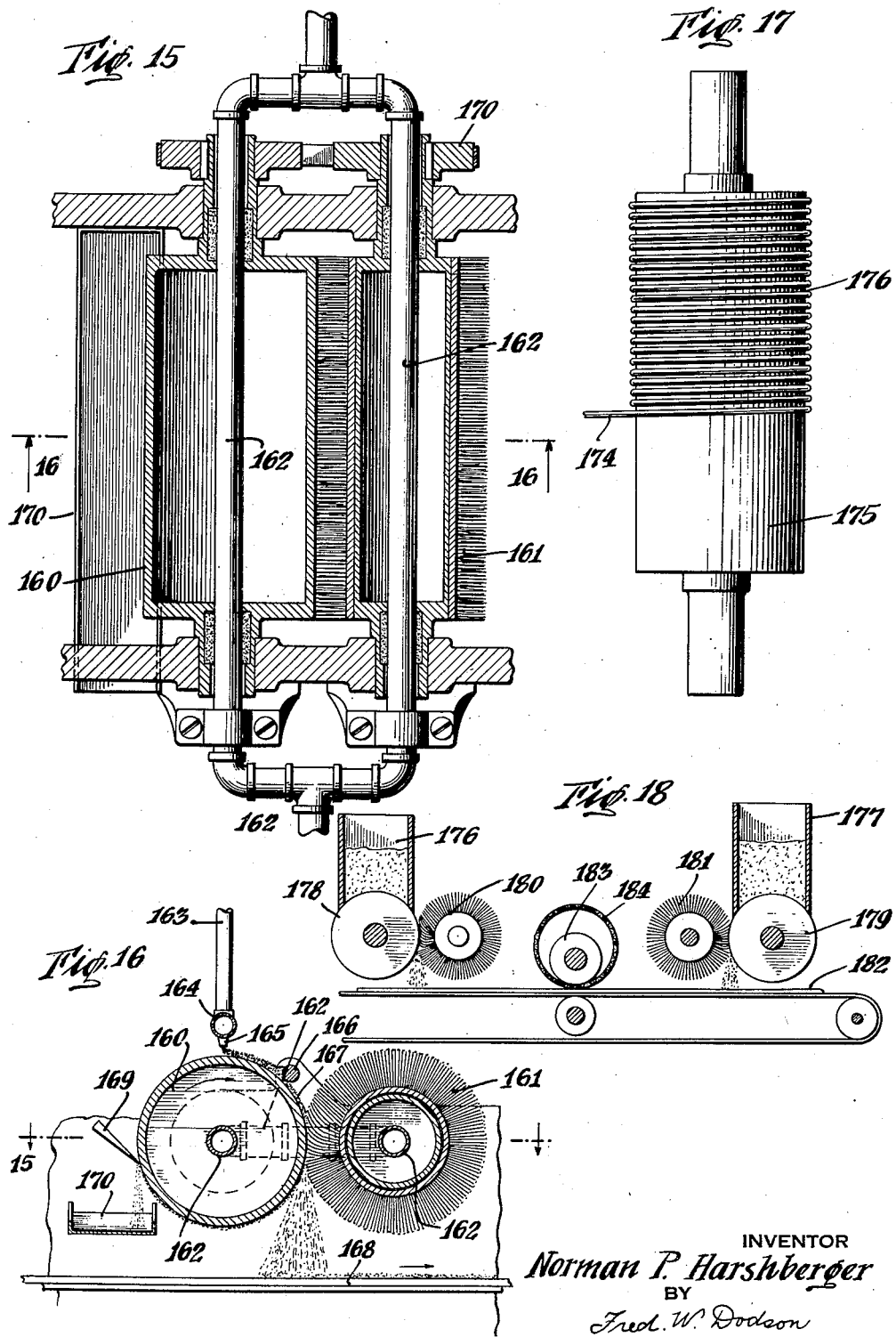

Patented May 2, 1939

2,156,286

UNITED STATES PATENT OFFICE 2,156,286

METHOD AND APPARATUS FOR MAKING BUILDING MATERIALS OR THE LIKE

Norman P. Harshberger, Scarsdale, N. Y., assignor to Bakelite Building Products Co. Inc., New York, N. Y., a corporation of Delaware Application June 15, 1935, Serial No. 26,770

15 Claims. (Cl. 91—44)

This invention relates to the manufacture of roofing materials and the like and more particularly to a method and apparatus for applying a cement composition coating to a base such as an impregnated web having an asphalt coating in which mineral granules are embedded, commonly called asphalt roofing material. The web may be continuous or may be cut into sections corresponding to shingles or the like.

More specifically the invention relates to an improved method and apparatus for making a cement coated, semi-rigid shingle or roofing of the type shown in my Patent No. 1,913,667 for Shingle element and method of making same, dated June 13, 1933.

An object of the invention is to provide an efficient, dependable and commercially practical machine of the type above indicated.

Another object is to provide a process and apparatus for applying the cement composition under conditions adapted to form a uniform coating which is thoroughly bonded to the underlying material.

Another object is to provide a machine for the above purpose which is cheap and simple to construct and easy to operate, and which may be readily controlled to vary the thickness and distribution of the cement composition.

Another object is to provide mechanism for simultaneously applying two or more different compositions to selected parts of the surface.

Another object is to provide means to control the moisture content of the cement which is applied to the web or base.

Another object is to provide a machine for applying quick setting compositions, such as hydraulic cement or other adhesive coatings.

Other objects and advantages will be apparent from the following description.

A feature of the invention consists in forcibly impelling the cement against the web so as to cause the cement to penetrate the surface and to become bonded to the asphalt layer and to the mineral granules.

In one embodiment this is accomplished by feeding the cement at a predetermined rate from a hopper to a moving belt or roll with which a rotating brush or impeller cooperates. The brush or impeller is rotated at a speed adapted to pick the cement composition from the belt or roll and to forcibly throw the same onto a web which is moving linearly with respect thereto. The impeller is out of contact with the web and is positioned to effect a predetermined distribution of the cement composition thereover.

Another feature of the invention consists in the use of grooved rolls to withdraw the cement from the hopper, the cement being carried in the grooves and removed therefrom by the impeller.

In one embodiment the cement is mixed with a liquid before being placed in the hopper. In certain instances, however, particularly for quick setting or flash setting cements, a dry cement may be fed from the hopper to a wet roll, whereby the cement and/or aggregate is hydrated at practically the instant of application to the web. The quantity of liquid applied to the roll may be controlled in accordance with the requirements of the particular cement employed. This type of operation may be continuous because the cement has no opportunity to set or change its characteristics in the hopper.

Another feature of the invention consists in the provision of a circular or oval hopper to eliminate corners or the like in which cement might remain to become dry or hard so as to interfere with the efficient operation of the device.

The invention also provides for treating the web or base with the cement composition either before or after cutting into desired shapes such as shingle elements.

Other features consist in the various details of construction and combinations of parts hereinafter more fully set forth.

The broader aspects of the invention will be better understood by referring to the following description, taken in connection with the accompanying drawings forming a part thereof, in which certain preferred embodiments have been described in detail for purposes of illustration.

In the drawings:

Fig. 1 is a side elevation of a machine constructed in accordance with one embodiment of the present invention;

Fig. 2 is a top plan view thereof;

Fig. 3 is a horizontal section of the cement applying mechanism taken along the line 3—3 of Fig. 4;

Fig. 4 is a longitudinal section taken on the line 4—4 of Fig. 3;

Fig. 5 is a vertical section taken along the line 5—5 of Fig. 4 showing the baffle plate and vibrating mechanism;

Fig. 6 is a detail view of the cutting roll;

Fig. 7 is a longitudinal section showing a modified type of feed roll;

Fig. 8 is a top plan view of a machine illustrating another embodiment of the invention;

Fig. 9 is a longitudinal section taken along the line 9—9 of Fig. 8;

Fig. 10 is a transverse section showing the invention as embodied in a mechanism for applying dry cement to a wet roll;

Fig. 11 is a section along the line 11—11 of Fig. 10;

Fig. 12 is a top plan view of a different form of hopper for feeding cement to the roll;

Fig. 13 is an end elevation of the roll and hopper of Fig. 12;

Fig. 14 is a longitudinal section through a cement applying mechanism illustrating a further embodiment of the invention;

Fig. 15 is a top plan view of a device for applying hot material, such as asphalt, to a web;

Fig. 16 is a longitudinal section taken on the line 16—16 of Fig. 15;

Fig. 17 is a plan view of a roll having wire wrapped around the surface thereof to form cement feeding grooves; and Fig. 18 is a diagrammatic side elevation of a machine for applying a colored coating to a textured surface.

In the following description and in the claims various details are referred to by specific terms for convenience. These terms, however, are to be given as broad an interpretation as the state of the art will permit.

Referring to the embodiment of the invention shown in Figs. 1 to 5, a machine is shown for applying wet cement from a hopper onto a moving web, such as a web coated with a layer of asphalt in which mineral granules are embedded, commonly known as asphalt roofing material.

The machine in general comprises a frame 20 carrying suitable bearings by which the various rolls to be described are supported and forming a base to which the various hoppers are secured. An endless conveyor belt 21 conveys a web 22 of the type above described, from a reel 23 past the cement applying mechanism 24, to a pull roll assembly 25 and a cutting roll 26 by which it is cut into the desired lengths, such as lengths corresponding to individual shingle elements or groups of shingle elements. The elements are fed out of the machine by an endless conveyor belt 27.

Considering the machine more in detail, the cement applying mechanism 24 may comprise a pair of hoppers 28, 29 (Figs. 3 to 5), mounted upon the frame 20 in a convenient position above the moving web 22. These hoppers preferably extend across the entire web and are adapted to contain a wet cement composition which is to be applied thereto. Mounted below the hoppers 28 and 29, and forming the bottoms of said hoppers, are a pair of feed rolls 30, 31, respectively, having shafts 32, 33 journaled in suitable bearings on the frame 20. The feed rolls 30, 31 may have grooved surfaces formed by helical grooves 34 which are adapted to receive the wet cement from the hoppers 28, 29 and to feed the same to the impellers to be described. The grooves 34 may be of any convenient size or shape. In Fig. 3, the grooves are illustrated as V-shaped, although it is obvious that they may be square or that they may be of any desired pitch or size. In one embodiment an 8" feed roll was used having helical V-shaped grooves with a pitch of 14 turns to the inch. It is obvious, however, that the specific size and shape will depend upon the speed of operation and upon the consistency of the material to be fed thereby. In some instances a roll with a plane surface or a soft surface may be preferred. The hoppers 28 or 29 may also have an adjustable gate similar to the gate 137 of Fig. 11 (to be described) to control the rate of feed of material to the rolls 30, 31.

Impellers 35, 36, carried by shafts 37, 38, respectively, in the frame 20, are positioned to contact with the surfaces of the rolls 30 and 31 or only with the composition being fed thereby, depending upon the type of operation, the nature of the composition and the desired characteristics of the finished surfacing. These impellers are elevated above the web 22 and are out of contact therewith. The impellers may constitute brushes having bristles formed of wire or fibre or other suitable material which is adapted to flex when it engages the surface of the rolls so as to enter the various grooves 34 and remove the cement composition therefrom. The speed and direction of rotation of the impellers is such that the cement composition is forcibly driven against the upper face of the web 22. As viewed in Fig. 4, the impeller 35, for example, may rotate in a counter-clockwise direction. The feed roll 30 may rotate in a clockwise direction so as to remove the material from the hopper 28 and to carry the same to the point of contact of the impeller 35. In some instances, however, such as with materials that will adhere to the roll, it may be desirable to cause the feed roll 30 to rotate in the opposite direction, in which case the composition will adhere to the surface thereof until it is removed by the impeller 35, the operation being substantially the same in either case. The feed roll 31 and impeller 36 rotate in opposite directions from the feed roll 30 and impeller 35 and operate in the same manner. Power may be applied for rotating the impellers 35, 36 and the feed rolls 30, 31 by any suitable means, such for example, as a belt (not shown) engaging a pulley 40 (Fig. 2) carried upon the shaft 32. The impeller 35 may be driven by a set of gears 41 mounted on the shafts 32 and 37. The impeller 36 and the feed roll 31 may be driven from the shaft 37 by means of cooperating gears 42. It is noted that the gears 41, 42 are so arranged that the impellers 35, 36 are driven at a higher speed than the feed rolls 30, 31. It is obvious that the specific type of driving mechanism for the various rolls may be varied as desired. A specific embodiment has been shown for purposes of illustration only. The impellers may be driven by a separate motor if desired in order to obtain the required difference in speed between the impellers and the feed rolls.

One of the hoppers, for example, the hopper 29, may be divided longitudinally as by a plate 45 (Fig. 3) into a pair of chambers which may receive different compositions, as for example compositions of different color. A longitudinal baffle 46 may be mounted adjacent the impeller 36 so as to separate the two compositions as they are impelled onto the web 22 whereby the surface will show a distinct line of division, such as between two colors. The baffle 46 may have an opening 47 (Fig. 5) to pass over the bristles of the impeller 35 or the bristles may be separated by a channel 48 to receive the baffle.

In certain instances the wet cement may adhere to the sides of the baffle 46. Hence means may be provided for vibrating the baffle so as to dislodge the cement and to prevent the same from adhering thereto. For this purpose, the baffle 46 may be slidably mounted on a pair of transverse rods 50 and held by springs 51 against stops 52 carried by said rods. A pin 53 may be slidably carried in a bearing 54 in the frame 20 in a position to bear against a cam 55 which may be mounted on, for example, the shaft 38 and may be adapted to rotate therewith. As the cam 55 rotates, the pin 54 is caused to reciprocate transversely and to cause a corresponding movement of the baffle plate 46.

It is to be understood that more than one dividing plate may be employed so as to divide the hopper into more than two chambers, if desired, in which case corresponding baffle plates may be mounted on the rods 50 and may be vibrated in a manner similar to that described above. A specific vibrating mechanism is shown merely as an example. Other suitable vibrating devices may be employed. In some instances, it may be desirable to vibrate the baffle vertically, using any well known equipment for this purpose.

In the operation of the cement applying mechanism above described, a wet cement composition is placed in each of the hoppers 28, 29 and power is supplied for rotating the feed rolls 30, 31 and the impellers 35, 36. The feed rolls then feed predetermined quantities of the cement composition from the hoppers to the point of contact of the impellers by which the composition is forcibly driven against the face of the moving web 22. In the case of a web having an asphalt coating in which mineral particles are embedded, the force may be sufficient to cause the cement composition to penetrate the surface of the asphalt between the granules and to make a firm bond therewith. It is obvious that the thickness of the cement layer thus applied may be controlled by the rate of feed of the cement from the hoppers. This may be controlled by varying the speed of rotation of the feed rolls or the shape or size of the grooves 34 or both and/or the speed of the web. The speed of the impellers may be controlled so as to cause the cement to be impelled with the necessary force for the above purpose. It is obvious that, if the desired thickness of cement is applied from one hopper, the second may be omitted. It is also obvious that either or both of the hoppers may be divided longitudinally for applying different compositions to the web as may be required.

In certain instances it may be desired to apply comminuted material such as fibrous, flocculent, and hair-like matter, ground cork, and the like, to the web along with the cement composition. For this purpose a third hopper 58 may be provided (Fig. 1) having a feed roll 59 forming the bottom thereof. The hopper 58 and the feed roll 59 are positioned so as to apply the material to substantially the point of contact between the impeller 36 and the feed roll 31. In some instances, a guide, such as a chute 57 may be employed to control the point of application of the comminuted material. The material is thus impelled with the cement composition, against the face of the web. This method ensures an intimate contact between the material and the cement composition so that the comminuted material is in effect individually coated with cement as it is applied to the web. The feed roll 59 may be driven by any suitable means, such as by a belt 60 engaging a pulley 61 rotating with the feed roll 59 and a driving pulley 62 which may be mounted on the shaft 33. The impellers may be covered by a shield 63 to prevent throwing of the cement composition thereby.

This arrangement may be useful for coating granules or the like with a coating composition. The granules may be placed in the hopper 58 and the coating composition may be placed in the hopper 29. The granules are thus brought into contact with the coating material and are discharged by the brush 36 in a coated condition. By controlling the viscosity of the coating, the relative speeds of the brush 36 and roll 31, the point of application of the granules, as well as the amount of wipe of the brush, the granules may be projected in a substantially fully coated condition or coated to any desired extent and with coatings of desired characteristics. They may be collected by the web 22, or the web may be omitted, in which case the coated granules are collected on the conveyor 21 and may be removed in any desired manner.

The pull roll assembly 25 may comprise a pair of vertically displaced rolls 68 carrying an endless belt 69. The web 22 may pass around the lower roll 68 with its coated face in contact with the belt 69 against which it may be pressed by a presser roll 70. The web then passes around the presser roll 70 in contact with the cutter roll 26, the presser roll 70 acting as a backing against which the cutter roll 26 may operate. The cutter roll 26 may be provided with sets of knives 71 which are adapted to penetrate the web 22, but preferably not to engage with the surface of the presser roll 70. It is obvious, however, that if the presser roll 70 is formed of some resilient material the knives 71 may be adjusted to slightly penetrate the same.

The cut web is fed from the machine by the belt 27 which is carried on suitable rolls 72. A texturing roll 73 may press against the coated face of the web so as to impart the desired finish thereto. The texturing roll may be made of any suitable material such as rubber and may have a raised design thereon which is to be impressed into the coated surface.

The pull roll assembly may be driven by suitable means such as a belt pulley 74, associated with the roll 70 or either of the rolls 68 may be driven. The cutting roll 26 and the rolls 72 carrying the belt 27 may also be driven by suitable gears 77 and 78.

In some instances it may be desired to cut or shape the web prior to the application of the cement coating. For this purpose a cutting roll 79 having knives 80 and a backing roll 81 may engage the web 22 ahead of the cement applying mechanism 24. A pair of feed rolls 82 may be mounted to pull the web 22 from the reel 23 and to feed the same to the cutting roll 79 and to the conveyor belt 21. The belt 21 may be carried on rolls 83 which may be idler rolls or one of said rolls may be driven by suitable means such as gears 84. Suitable means such as gears 41a and a belt 84a may be provided for driving the feed rolls 82 and the cutting roll 79. The reel 23 may be carried on a suitable support such as a pedestal 85.

The cutting rolls 79 and 26 may be adapted to cut the web into lengths corresponding to shingle elements or groups of shingle elements and may also impress designs, and/or slit the web into desired forms such as to represent spaces between shingles or shingles of irregular shape, or the like. It is to be understood that one of the rolls, for example, the roll 79, may shape the web and the other roll 26 may sever the web into lengths or vice versa. If the web is severed by the roll 79 the belt 21 must be driven so as to convey the cut elements past the cement applying mechanism 24. A guide means such as a plate 76 may also be used to direct the elements to the presser roll 70. If the roll 79 merely shapes the web, the belt 21 may be undriven as the web will be fed by the pull roll assembly 25. Obviously one of the rolls 79 or 26 may be omitted if not required in any particular instance.

The web may constitute asphalt roofing material having a granular surface. The cement composition is applied thereto in one or more layers from the hoppers 28 and 29 under sufficient force to bond firmly to the surface. The cement may be distributed as desired in accordance with the distribution in the different hoppers or in the chambers of the hoppers. The exposed portion of the shingle may thus be made of a different color or a different composition from the portion to be covered by the other courses of shingles.

It is to be understood that divided pieces, such as pressed or molded board or plastic materials, may be fed to the conveyor 21 to be coated by cement or the like or to receive a coating of colored cement for imparting the desired finish. The coated pieces may be removed from the belt 21 ahead of the pull roll assembly if desired, as for example, to prevent the surface from contacting with a roll after the coating has been applied thereto.

It is obvious that the hopper and brush arrangement may be repeated any desired number of times so as to build up a laminated coating on the web 22. It has been found that the cement may be taken from the hoppers onto the feed rolls in a thin layer which is beaten onto the web by the impellers. The impellers beat a certain quantity of air into the mixture and produce an open porous layer. In general a thinner layer produces a more open texture. For a thin composition such as a color coating the feed roll may be formed with a fine thread.

Fig. 7 illustrates an embodiment in which the feed roll 30a is provided with pins 87 which may be variously spaced over the surface thereof and are adapted to engage and pull the composition in the cooperating hopper 28a so as to feed the same to the impeller 35 which is similar to that above described. The sides of the hopper 28a may be recessed as at 88 to provide clearance for the pins 87. The bristles of the impeller 35 may be sufficiently flexible to pass over the pins 87 for removing the composition from the roll 30a. Obviously the pins 87 may be of any desired size or shape and they may be spaced over the roll 30a as required. They may take the form of bars or blades in some instances, or may constitute prongs or bristles, depending upon the material to be fed thereby.

This embodiment may be found useful, for example, if the composition is so adherent as not to feed readily from the hopper or if the composition is coarse or fibrous.

Figs. 8 and 9 illustrate an embodiment in which a single hopper is used to successively apply two different materials to the web. These figures also illustrate different forms of grooves which may be employed on the feed rolls as well as a somewhat different arrangement of pull rolls.

In this embodiment the web 22 is passed under the cement applying mechanism including a hopper 89, feed rolls 90, 90a and cooperating impellers 91, 91a, on a conveyor belt 21 similar to that shown in Fig. 1, then to the pull roll assembly 92, the cutting roll 93 and pressing and texturing rolls 94.

More specifically, the rolls 90 and 90a together form the bottom of the hopper 89 and may rotate in opposite directions so as to cause the composition to feed from the hopper between the rolls. The quantity of material fed will depend upon the surface of the rolls, the speed of rotation and the spacing between the rolls. In the embodiment shown the rolls 90 and 90a are provided with peripheral grooves 95 and 96 respectively, which are of any convenient shape such as square. The grooves 95 are helically disposed whereas, the grooves 96 are circular. It is obvious however that they can be of the same shape and arrangement or may be varied, as desired.

The hopper 89 may have a transverse baffle 97 which divides the hopper into two chambers 98 and 99 adapted to receive different materials for successive application to the web. The baffle 97 may extend downwardly to about the center lines of the rolls 90 and 90a so that a gate is formed between the baffle and the surface of each roll. In the case of grooved rolls the baffle may contact with the surface of the rolls so as to limit the feed of material to the grooves. Obviously, the grooves may be omitted in some instances in which case the material would be fed as a layer over the surface of the roll, the thickness of which is determined by the dimensions of the space formed between the roll and the baffle 97 or between the surfaces of the two rolls if the baffle is omitted.

The material adheres to the rolls until engaged by the impellers 91 and 91a which are rotated at high speed to forcibly impel the material against the web 22 as described in the embodiment of Figs. 1 to 5.

The impellers 91 and 91a may be mounted on shafts 100, 101, respectively, and the rolls 90, 90a may be mounted on shafts 102, 103, respectively, said shafts being journaled in suitable bearings carried by the frame 104 of the machine. Power may be applied to a pulley 106 carried by one of the shafts, for example, by the shaft 100. The other shafts may be driven by a set of gears 107 which may be associated therewith in any convenient manner.

The pull roll assembly 92 may include the rolls 110, 111, 112, arranged in the form of a triangle around which a belt 113 is passed. A pressure roll 114 may engage the outside of the belt 113 between the rolls 110 and 111. The web 22 is passed under the belt 113 and over the roll 114 with the coated face held in contact with the belt by the pressure roll 114. Guide plates 115, 116 may be used to direct the web through the pull roll assembly. Such plates are particularly useful if the web is discontinuous or is cut into short lengths ahead of the pull roll assembly.

A tightening roll 117 may be mounted above the belt 113 in a position to engage the surface thereof for holding the belt in tight condition. The rolls 110, 111, 112, 114 may be mounted on suitable shafts 118 which are journaled in the frame 104. One or more of the shafts 118 may be driven, as by a belt pulley 120.

The web 22 may pass from the pull roll assembly 92 to the cutting roll 93 and backing roll 125, which may be similar to the rolls 26 and 70 of Fig. 6. The cutting roll 93 may have knives 126 adapted to sever the web or to impress or shape the same as desired. Certain of the knives 126 may, for example, cut slots to resemble the spacing between shingles and others may sever the web into lengths corresponding to groups of shingles. The cutting roll 93 may be driven from one of the shafts 118 as by a belt 127.

The cut web now passes to a discharge conveyor 130 carried on rolls 131. Pressing and texturing rolls 94 engage the face of the web to effect the desired surface texture and appearance. These rolls may be made of rubber or the like and operate similarly to the roll 73 of Fig. 1. One of the rolls 94 or one of the rolls 131 may be driven from the cutting roll 93 by suitable gears 132. It is to be understood that the rolls 93, 94, 125 and 131 are suitably journaled in the frame 104.

In the operation of this embodiment, different compositions may be used in the chambers 98 and 99. A base composition may be placed in the chamber 98, for example, and a surfacing composition may be placed in the chamber 99, or if desired the same composition may be applied from both chambers to form a double coating on the web. The operation is otherwise similar to that of Fig. 1.

Figs. 10 and 11 illustrate an embodiment for applying dry cement to a wet roll and then impelling the wet mixture to the web. Only the hopper and cement feed mechanism are shown. It is to be understood that this mechanism may be substituted for the corresponding parts of machines of Figs. 1 or 8.

More specifically, Figs. 10 and 11 show a roll 135, which may be plain or grooved similar to the rolls 30, 31, 90 or 90a above mentioned, forming the bottom of a hopper 136. The hopper may have an adjustable gate 137 to control the quantity of cement fed by the roll 135, which gate may be vibrated if desired by a suitable vibrator 138 such as an electric vibrator. Moreover the gate may be variously positioned with respect to the roll and side walls of the hopper according to the requirements of each particular case.

The cement fed by the roll 135 falls onto a distributing device 140, such as a rotating screen, which may comprise a cylindrical screen mounted on a shaft 141 and driven in any suitable manner.

The cement falls from the distributor 140 to a roll 142 which may be plain or grooved, similar to the roll 135. The surface of the roll 142 is wetted by a suitable feed mechanism, as for example, a fluted roll 143 rotating in a water tight housing 144 which is fed with water from a pipe 145 and discharges through an opening 146 onto the roll 142. The quantity of water is determined by the speed of rotation and by the configuration of the fluted roll 143. The opening may be continuous or may constitute a series of perforations along the housing 144 adapted to uniformly wet the surface of the roll 142. A wiper 147 may be provided to prevent water from following the surface of the roll 142 and dripping onto the web.

The cement is hydrated upon contact with the wet surface of the roll 142 and is adapted to set when impelled onto the web 22 by a rotating impeller 35 operating in a manner similar to the impeller 35 above described. This embodiment is particularly useful with quick setting or flash setting cements as the water is applied at the time of use of the cement. It also permits the quantity of water and the consistency of the cement to be maintained substantially constant for extended periods.

This embodiment is also useful for applying adhesive coatings with granules or the like. The granules may be supplied from the hopper 136 and the adhesive material may be applied to the surface of the roll 142. The granules thus become coated with the adhesive and are impelled onto the web 22 by the brush 35. This device may also be used for coating individual particles. In such cases it is contemplated that the speed of the rotating brush and the extent of wipe of the bristles thereof upon the particles will be adjusted to create a suitable spinning action of the particles to obtain the desired extent of coating. Also the particles may then be collected on the web 22 and kept in vibration by suitable mechanism until they are in condition for removal by other desired means.

Figs. 12 and 13 show an embodiment in which a plurality of round hoppers 150 are associated with a roll 30a which corresponds to the roll 30 of Fig. 1. This construction eliminates corners in which the cement might accumulate and facilitates the proper feed of the cement to the roll 30a. The two hoppers 150 may be displaced so as to feed material to different parts of the web or as to apply different compositions thereto. Obviously the hoppers may be oval or of other shapes in which corners are eliminated.

Fig. 14 shows an arrangement in which wet cement is fed from a hopper 151 by a roll 152 and is transferred from the roll 152 to a rotating brush 153 which throws the same onto the web 22. A scraper bar 154 may scrape the cement coating from the roll 152 onto the brush 153 as the roll rotates. A shield 155 may be used to direct the cement from the brush 153 onto the web.

The brush picks the material off the roll and carries it around under the guard 155. As soon as it passes the end of the guard it is impelled onto the web by the resilience of the bristles and by centrifugal force.

Figs. 15 and 16 show an embodiment in which hot asphalt or the like may be applied to a web. In this embodiment a roll 160 and a brush 161 are heated by suitable means such as steam pipes 162. The roll and brush are preferably made of metal so as to readily conduct heat received from the steam pipes 162. A hot material, such as asphalt, may be supplied from a pipe 163 having a header 164 extending along the roll 160 and being provided with nozzles 165. The layer of asphalt or the like may be spread by a bar 166 to form a smooth coating 167 having a predetermined thickness.

This coating 167 is carried around by the rotating roll 160 and is engaged by the brush 161 which is rotated at a speed to pick off the asphalt and to impel the same as a spray against a web 168. A scraper 169 may scrape the excess asphalt into a sump 170. The scraper also prevents asphalt from following around the surface of the roll and dripping onto the web 168. Obviously the roll 160 and the brush 161 may be rotated by suitable means such as belt pulleys 170. A hood not shown may be provided over the roll 160 and brush 161 or any portion thereof to conserve the heat. Moreover, additional heating means such as a blower or a heating element and reflector may be provided to direct heat to the area of contact of the roll and brush.

It is to be understood that by the addition of an aggregate, which may be deposited onto the roll 160 carrying the adhesive, and/or onto brush 161, I may build up mastic forms on the moving member below. In some instances it may be unnecessary to heat the brush 161, in which case the steam pipe can be omitted. This device may be used to apply a congealable coating, such as an adhesive or an emulsion, to any surface such as a felt web of the type above described. It may also be used as a continuous process in connection with the cement applying mechanism to make coated asphalt roofing material. It may be desirable to provide means to take up wear of the surface of the feed roll. This may be conveniently accomplished as illustrated in Fig. 17 by wrapping a wire 174 around the surface of a feed roll 175, which may be used in a manner similar to the rolls 30, 31, 90 and 90a above described. The roll 175 may have a grooved surface in which the wire 174 may be seated or it may have a plain surface. In any event, the wire 174 forms grooves 176 between adjacent convolutions, which are adapted to feed material from a hopper to a rotating brush. The wire 174 may be removed and replaced when worn. This construction is cheap and is adapted to various uses because different sizes of wire or different spacings may be used as required.

The embodiment of Fig. 18 may be used to apply a colored coating to a textured surface. The construction is similar to that of Figs. 1 to 5, in that two hoppers 176, 177 are provided having rolls 178, 179 and brushes 180, 181, respectively, operating in the manner above set forth to apply material to a moving web 182. In this embodiment the two hoppers 176, 177 are separated and a texturing roll 183 is disposed therebetween. A free cylindrical screen 184 is disposed around the texturing roll 183 so as to contact with the surface of the web 182. The screen 184 prevents the material on the surface of the web 182 from sticking to the roll 183 and also serves as a texturing means. It may, for example have a design formed thereon. The texturing roll 183 may be made of steel or rubber, provided the screen 184 is used. The screen 184 may be omitted in certain instances, in which case the roll 183 may be made of rubber so as to prevent the cement from sticking thereto and being thus removed from the web.

In operation a base material such as a plastic cement is applied from the hopper 176 to the web 182, the surface is pressed and textured by the roll 183 and the screen 184, and a finishing coating, such as a colored cement composition may be applied from the hopper 177, after which the web may be removed without causing other objects to come in contact with the coated surface.

It is to be understood that any of the above embodiments may be substituted for the cement feeding mechanism of Figs. 1 or 8, and that various combinations and substitutions may be made within the scope of this invention. It is also to be understood that where hydraulic cement or compositions of similar consistency are employed as the fed material, mechanism for vibrating the coated web, individual elements or conveying mechanism may be incorporated at any point in the machine following any application operation to aid in densifying the fed material before complete setting and in some instances to enable drier or more viscous compositions than would ordinarily be used to be employed and also to obtain where desired, a leveling action. Certain preferred embodiments have been set forth for purposes of illustration only. The invention is only to be limited in accordance with the following claims when interpreted in view of the prior art.

I claim:

1. In a machine for making cement faced roofing, means to feed a base material to be faced, a rotating roll, a hopper extending axially of said roll to discharge a cement composition thereto, a brush engaging said roll to impel the cement composition onto said base material, means dividing said hopper into a plurality of independent chambers which are axially displaced along said roll so as to supply different compositions to different parts of said base material and a baffle associated with said brush to separate the different compositions as they are impelled onto said base material, whereby a sharp line of demarcation is maintained therebetween.

2. In a machine for making cement faced roofing, means to feed a base material to be faced, a rotating roll, hopper means extending axially of said roll to discharge a wet cement composition thereto, a brush engaging said roll but out of contact with the base to impel the cement composition onto said base material, and said hopper means comprising a plurality of independent chambers which are circumferentially displaced about said roll so as to supply successive layers of different compositions thereto.

3. A device for applying a cement composition or the like to a moving base material, which comprises a hopper for storing a quantity of said composition, a rotating roll forming the bottom of said hopper and adapted to continuously feed predetermined quantities of said composition therefrom, and a rotating impeller engaging said roll to remove the composition from said roll and adapted to forcibly impel the same onto said base material, said hopper having no corners in which said composition can pile up.

4. Feed mechanism comprising a hopper, and a feed roll having a wire wrapped around the surface thereof to form a helical groove adapted to feed material from said hopper.

5. In a surfacing machine means to treat a sludgy material surfacing comprising, a roll positioned to pressure contact said sludgy material and a free rotatable cylindrical apertured element surrounding said roll, said apertured element having a diameter greater than said roll and being free to strip material from said roll.

6. A device for applying a wet cement composition to a roofing base or the like whereby predetermined amounts of the wet composition are fed, and said composition is securely bonded to said base, which comprises means to support the base to be treated, a hopper for receiving a quantity of said wet composition, rotary feed means positioned to continuously remove predetermined quantities of wet composition from the bottom of said hopper, impeller means positioned to remove the wet cement composition from said feed means and discharge the same upon the base to be treated, and driving means to rapidly move said impeller means; the impeller means being positioned in proximity to but out of contact with the base to be treated and with its point of discharge of said wet cement composition a distance from said base considerably less than its own diameter and that of said feed means, and having such velocity as to impart said wet cement composition to the base with sufficient force to produce an effective bond between said base and cement composition when the latter has hardened.

7. A device for applying a wet cement composition to a roofing base or the like, whereby to obtain substantially uniform distribution of the wet cement composition upon the base, which comprises hopper means for receiving a quantity of the wet cement composition, a pair of feed means to continuously remove predetermined quantities of the wet cement composition from the hopper means, and a pair of impeller means driven at high speed positioned to remove the wet cement composition from the feed means and having sufficient velocity to discharge the same upon the base to be treated with sufficient force to produce an effective bond; the pair of impeller means being positioned to discharge separate streams of the wet composition and produce laminae of wet cement composition upon the base to be treated upon relative motion of said base and streams of wet cement composition and being positioned with their points of discharge of the wet composition, a distance from the base to be treated less than their own transverse dimension.

8. A device for applying a wet cement composition to a roofing base or the like, whereby to obtain substantially uniform distribution of the wet cement composition upon the base, which comprises hopper means for receiving a quantity of the wet cement composition, a pair of feed means to continuously remove predetermined quantities of the wet cement composition from the hopper means, and a pair of driven rotary means positioned to remove the wet cement composition from the feed means and discharge the same upon the base to be treated; the pair of rotary means having opposite directions of rotation and being positioned to face each other and discharge separate streams of the wet composition and produce laminae of wet cement composition upon the base to be treated upon relative motion of said base and streams of wet cement composition.

9. The method of forming a thin layer of cement composition upon a base material which comprises forcibly impelling a uniform stream of non-lumpy particles of a wet cement composition against the base material with sufficient force to obtain an effective bond, forcibly impelling a second stream of wet composition against the base material before the first portion has set and applying said portions as to form laminae thereof to improve hydration of the applied cement layer.

10. The method of applying a wet cement composition to a base material having a rough textured surface to fully coat the portion to be treated which comprises forcibly impelling a uniform stream of particles of said composition against the base material to cover a predetermined area, forcibly impelling a second uniform stream of said composition against the base material over the same area before the first deposit has set, applying said portions as to form laminae thereof, and applying said portions such that their trajectories are oppositely directed with respect to the plane of said base material.

11. Apparatus for applying bands of wet composition to a base, comprising means to receive supplies of wet composition of contrasting visual effect, moving means to withdraw said contrasting compositions in adjacent bands upon its surface from said supply means and centrifugal impeller means having baffle means associated therewith at the line of separation between the fed bands of contrasting effect, to impel said compositions to the base and produce similar bands of contrasting visual effect having substantially sharp lines of demarcation thereon.

12. A device for applying a wet cement composition or the like to a base whereby said composition is securely bonded thereto, which comprises means to support a base to be treated, a hopper for receiving a quantity of cement composition, a feed roll forming the bottom of the hopper to remove predetermined amounts of wet cement composition from the hopper, a rotary bristle impeller positioned out of contact with the base but in proximity thereto, and positioned to remove predetermined amounts of cement composition from the feed roll and discharge a substantially uniform stream thereof upon said base surface, the point of discharge of said composition by said impeller being also in proximity to said base, and there being means to move said impeller at a higher surface speed than said feed roll, and the position of said point of discharge and the velocity of said distributor being such as to cause impingement of said wet cement composition upon the base with sufficient force to produce an effective bond between the base and cement composition when the latter has hardened.

13. A method of applying coating material by an applying means to a base having a textured surface characterized by a plurality of protuberances and depressions therebetween, and which base and applying means have relative motion with respect to each other and substantially parallel to the plane of the surface to be coated, which comprises applying at least two continuous applications of coating material over a common area of said base, each application comprising a coating stream characterized by the trajection of particles thereof by a rotary impeller, directing the average trajectory of said coating streams oblique to the plane of the surface to be coated and directing one stream in the direction of relative motion of said surface, and directing the second opposed to said relative motion.

14. In the process of forming cement coated roofing, the steps which comprise, providing a roofing base having a surface to receive a cement coating, moving said base relative to a source of supply of cement coating composition, feeding a predetermined layer of said composition from said source of supply, moving said layer to a point in close proximity to said coating receiving surface, forcibly impelling a stream of particles of said composition layer against said receiving surface while the latter is moving and in a manner as to produce a substantially continuous coating thereon, said particle stream being characterized by the trajection of said particles by a rapidly moving impeller, and said particles being impinged upon said moving base surface with sufficient force as to be securely bonded to said base when said coating is hardened.

15. The method of forming a structure comprising substantially homogeneous superimposed lamina applications of wet binder composition, certain of which include fibre, which comprises providing a base upon which to form said structure, moving said base relative to means of supply of said application material, feeding a plurality of separate predetermined layers of said application material from said means of supply, moving said layers to points adjacent said base, and in proximity thereto, said points being spaced apart in the direction of motion of said base, impelling against said base streams of particles comprising the material of said fed layers while still wet, said streams characterized by the trajection of particles thereof by a rotary impeller, and moving said base relative to said streams as to successively receive the impinging particles thereof and produce a structure of united homogeneous laminae of said particles.

NORMAN P. HARSHBERGER.